(12) United States Patent
Rabe

(10) Patent No.: US 7,122,097 B2
(45) Date of Patent: Oct. 17, 2006

(54) ULTRASOUND HORN

(75) Inventor: Magnus Rabe, Akarp (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/502,401

(22) PCT Filed: Feb. 3, 2003

(86) PCT No.: PCT/SE03/00181

§ 371 (c)(1),
(2), (4) Date: Jul. 26, 2004

(87) PCT Pub. No.: WO03/068487

PCT Pub. Date: Aug. 21, 2003

(65) Prior Publication Data

US 2005/0028942 A1    Feb. 10, 2005

(30) Foreign Application Priority Data

Feb. 12, 2002 (SE) .................................. 0200394

(51) Int. Cl.
*B32B 37/00* (2006.01)

(52) U.S. Cl. ................ 156/580.2; 156/73.1; 156/580.1

(58) Field of Classification Search ............... 156/73.1, 156/580.1, 580.2; 425/174.2; 228/1.1, 110.1; 310/321, 323.18; 264/442, 443, 444, 445
See application file for complete search history.

(56) References Cited

U.S. PATENT DOCUMENTS

| | | | | |
|---|---|---|---|---|
| 3,113,225 A | * | 12/1963 | Kleesattel et al. | ............ 310/26 |
| 3,671,366 A | | 6/1972 | Miller | |
| 4,315,181 A | * | 2/1982 | Holze, Jr. | .............. 310/323.19 |
| 4,363,992 A | * | 12/1982 | Holze, Jr. | .............. 310/323.19 |
| 4,651,043 A | | 3/1987 | Harris et al. | |
| 5,057,182 A | * | 10/1991 | Wuchinich | ............... 156/580.1 |
| 5,110,403 A | | 5/1992 | Ehlert | |
| 5,171,387 A | * | 12/1992 | Wuchinich | ................. 156/73.3 |
| 5,879,364 A | | 3/1999 | Bromfield et al. | |
| 2001/0027987 A1 | | 10/2001 | Kyomasu et al. | |

FOREIGN PATENT DOCUMENTS

| | | |
|---|---|---|
| EP | 0 615 907 A1 | 9/1994 |
| EP | 0748660 A | 12/1996 |
| EP | 1 088 760 A2 | 4/2001 |
| GB | 2344487 A | 6/2000 |

\* cited by examiner

*Primary Examiner*—James Sells
(74) *Attorney, Agent, or Firm*—Buchanan INgersoll & Rooney PC

(57) ABSTRACT

The invention relates to an ultrasound horn comprising a fixing section (1*a*), a sealing section (1*c*) and a transfer section (1*b*) extending therebetween, one or more elongate recesses (3, 4) being formed at least in the transfer section (1*b*), and said recesses (3, 4) extending in a direction (A) between the fixing section (1*a*) and the sealing section (1*c*). Said recesses (3, 4) have a rounding-off encompassing, along the rounding-off, at least a first portion (5*a*, 7*a*) with a first radius of curvature, a second portion (5*b*, 7*b*) with a second radius of curvature and a third portion (5*c*, 7*c*) with a third radius of curvature. The invention also relates to a novel forming of the transfer section (1*b*) and recesses (9, 10) at the ends of the sealing section (1*c*).

10 Claims, 3 Drawing Sheets

ULTRASOUND HORN

TECHNICAL FIELD

The present invention relates to an ultrasound horn comprising a fixing section, a sealing section and a transfer section extending therebetween, one or more elongate recesses being formed at least in the transfer section, and said recesses extending in a direction between the fixing section and the sealing section.

BACKGROUND ART

It has long been known in the art to employ ultrasound to weld or fuse together thermoplastic material. Normally, the ultrasound device consists of a drive unit, a so-called converter, which is connected to an a.c. current source and which is disposed to convert the electric oscillation into a mechanical oscillation in the ultrasound unit, and a horn which transfers the oscillation to the material which is to be fused together. As one example of an ultrasound device of this type, mention might be made of U.S. Pat. No. 3,671,366. Occasionally, a so-called booster is mounted between the horn and the converter in order that the desired oscillation picture be obtained.

EP-A1-0 615 907 schematically describes the principle of an ultrasound sealing apparatus. In this publication, a description is further given of a specific variation of an ultrasound sealing apparatus which is very compact in relation to the generally described design with converter, booster and horn. The ultrasound sealing apparatus according to this embodiment comprises an ultrasound unit which includes a drive unit, a so-called horn and a number of reaction bodies. The horn is intended to abut, with a sealing surface formed in its end, against, for example, a packaging material which is to be sealed and clamped with a sealing force against a counter abutment. The drive unit is connected to an a.c. current source and is disposed to convert the electric oscillation into a mechanical oscillation in the ultrasound unit. The horn and the reaction bodies are located on either side of a nominal nodal plane and are designed so that the resonance frequency (or inherent frequency) which is used as the working frequency will give rise to axial oscillations of large amplitude in the sealing surface of the horn and no amplitude, respectively, at the centrally located nodal plane. The ultrasound unit is secured in relation to other machine parts at the nominal nodal plane.

Within the packaging industry, use is normally made of ultrasound sealing in order fuse together two layers of plastic-coated paper laminate for forming a liquid-tight joint. The desired fusion of the material is achieved in that the material which is clamped between the sealing surface and the counter abutment is subjected to a pulsating compression, which, because of hysteresis losses, gives rise to inner heating of the material which in turn results in the material in question partly melting and being fused together. In so-called roller-fed systems, a paper tube filled with product such as milk, juice or the like is clamped together in the transverse direction so that the tube is formed into closed cushion cartons. In so-called sheet-fed systems, an open tube end is flattened and clamped together approximately as the end of a toothpaste tube or the like. These techniques are generally well-known to a person skilled in the art and will not be described in greater detail here.

FIG. 1 of the accompanying Drawings shows an ultrasound horn which is intended to be connected to a drive unit and possibly a booster in a conventional manner (not shown). The ultrasound horn 1 has a sealing surface 2 of a width B which is slightly greater than the width of the joint which is to be created. In order to obtain a unitary amplitude in the axial A oscillations of the sealing surface 2 along the entire width of the sealing surface 2, the ultrasound horn 1 is provided with two axially extending recesses 3, 4.

An ultrasound horn 1 cannot be made infinitely wide, but it is necessary to take into account the transversely directed oscillations which occur because of the transverse contraction of the material (Poissons number). If a horn is made excessively wide without being provided with recesses, its transverse oscillations, which per se limit the oscillations in the axial direction, result in an excessively great variation in axial amplitude along the sealing surface. If the sealing distance is excessively large for a monolithic cast ultrasound horn of the type which is shown in EP-A1-0 615 907, it is possible either to place a plurality of horns side by side or to make a wide horn with a number of recesses which corresponds to the division into several horns. Using a plurality of horns placed alongside one another is less cost-effective and, moreover, the difficulty is introduced of orienting the horns correctly in relation to one another.

As was explained above, these recesses 3, 4 are thus necessary for correct operation to be obtained for a construction with one single wide horn. The recesses 3, 4 are designed so that they are defined by two parallel lines 3a–b, 4a–b which are located at a distance C from one another and two semi-circles 3c–d, 4c–d at the ends. The semi-circles 3c–d, 4c–d have a radius which is half as large as the above mentioned distance C between the parallel lines.

It has unfortunately proved that, in the ultrasound sealing, the inner tensions in the material reach high levels precisely at these recesses 3, 4, and it is common that the ultrasound horn 1 fails at these recesses 3, 4 because of fatigue cracks which derive from the lower end radii 3c, 4c of the recesses 3, 4. In accordance with general construction and design rules, it has been tested, in order to be able to increase the end radius 3c, 4c in the hope of reducing the levels of tension, to increase the width C of the recesses 3, 4. However, this has proved not to be successful, since an increased width C of the recesses 3, 4 increases the flexural effects at the lower ends 3c, 4c of the recesses 3, 4, An increased width C of the recesses also gives rise to an increased variation in the oscillation amplitude of the sealing surface 2 immediately beneath the recesses.

EP-A2-1 088 760 also discloses various designs of elongate sealing horns provided with axially extending recesses. In this context, it might also be mentioned that there are different configurations of the ultrasound horns as regards their profile seen from the side. The above-mentioned EP-A1-0 615 907 shows an arcuate version, in FIG. 1 there is shown an arcuate design with a right angle upper portion and there are also variations where the arcuate portion in FIG. 1 is instead rectilinear cuneiform (see broken line in FIG. 1). Regardless of the form of the profile, they all suffer from the above-outlined problem as regards fatigue cracks at the ends 3c, 4c of the recesses 3, 4.

Hence, there is today no satisfactory design and construction of ultrasound horns. The variations which are in existence today have different advantages as regards unitary amplitude along the width of the sealing surface, as regards propagation of inherent frequency because of manufacturing tolerances, as regards proximal, undesirable other inherent frequencies etc. However, they also suffer from similar problems in respect of failure at the recesses and other failures at different transitional zones between different parts.

SUMMARY OF THE INVENTION

One object of the present invention is thus to realise a solution to the above-outlined problems.

According to the present invention, the above-outlined problems have been solved by an ultrasound horn of the above-mentioned type which has been given the characterising features that said recess, at least at that end which is located most proximal the sealing section has a rounding off comprising, along the rounding off, at least a first portion with a first radius of curvature, a second portion with a second radius of curvature and a third portion with a third radius of curvature.

By forming the rounding off of the recess in this manner with different radii, it is possible to even out the tension distribution along the rounding off and moreover reduce the maximum tension. It is interesting to note that if the rounding off is designed with more than one radius, one of the radii will automatically be less than the nominal radius which could have been employed if only one radius was used for the rounding off. Thus, the construction according to the present invention entails that, directly contrary to conventional design and construction rules, a radius is made smaller with a view to reducing the tensions at the rounding off. Despite implementing this different design, it has proved that the tension level falls and is evened out thanks to the rounding off being composed of several different radii.

Preferred embodiments of the present invention are apparent from the appended subclaims.

Advantageously, the recess at the rounding off is of a width which is less than the first radius of curvature. By such means, an even transition will be obtained between the substantially straight section of the recess to the beginning of the rounding off, which further contributes in reducing and evening out the tension level at the rounding off. For the same reason, the recess is, preferably adjacent the rounding off, of a width which is less than the third radius of curvature.

According to one preferred embodiment, the second radius of curvature is less than the first radius of curvature. As a result of the smaller radius, it is possible to obtain even transitions between the radii and still obtain the entire sweeping angle of 180° so that the rounding off connects to both sides of the recess. As was mentioned above, this smaller radius surprisingly contributes in evening out and reducing the tension level at the rounding off. For a corresponding reason, the second radius of curvature is smaller than the third radius of curvature.

According to one preferred embodiment, the second radius of curvature is less than the width of the recess adjacent the rounding off. As was mentioned above, the smaller radius makes it possible to obtain even transitions between the radii and nevertheless retain the entire sweeping angle of 180° so that the rounding off connects to both sides of the recess. As was mentioned above, this smaller radius surprisingly contributes in evening out and reducing the tension level at the rounding off. For the corresponding reason, the second radius of curvature is preferably also smaller than the width of the recess adjacent the rounding off.

Advantageously, the rounding off of the recess is symmetric. Above all for reasons of design and production engineering, this is a preferred embodiment.

In order really to ensure even distribution of the tension level in the rounding off, it is preferred that the transitions between the different portions of the recess with different radii of curvature are substantially tangential.

The above-mentioned problem structure involving high tension levels and uneven distribution of the tension also occurs in the transfer section as such. With a view to reducing the level and evening out the tensions, this part of the ultrasound horn may also be designed in accordance with the concept of the present invention. This concept has been utilised on an ultrasound horn which comprises a fixing section, a sealing section and transfer section extending therebetween, the transfer section being curved in such a manner that a line which extends from the sealing section to the fixing section and which follows the transfer section describes a curve.

The above-outlined problem has been solved for this ultrasound horn in that it has been given the characterising features that the transfer section has at least a first portion with a first radius of curvature and a second portion with a second radius of curvature, and that, of said portions, the first portion is located more proximal the fixing section and the radius of curvature of the first portion is less than the radius of curvature of the second portion. As was described in detail above, the curving of the transfer section composed of a plurality of radii contributes in evening out and reducing the tension level, which implies that it is possible to reduce the amount of material in the transfer section. This is desirable not only for reasons of weight and cost, but also for functional reasons. It is possible to imagine an ultrasound horn of this type as being a large mass (the fixing section), a spring (the transfer section) and a small mass (the sealing section) where a slight oscillation applied on the large mass will be transferred by the spring to the smaller mass which will oscillate with substantially the same amount of movement, which implies that it will oscillate with considerably greater amplitude than the large mass. A slim transfer section refines this functional model.

The above-outlined problem structure with high tension levels and uneven distribution of the tensions also occurs in the sealing section as such. In order to even out the axial oscillation picture also at the outer ends of a rectilinear sealing surface, it is normal to provide the end walls of the ultrasound horn with recesses corresponding to a part of the through-going recesses in the transfer section. Just like the recesses in the transfer section, these end wall recesses can have a negative influence on the tension distribution in the transition between the sealing section and the transfer section. With a view to reducing the level and evening out the tensions, this part of the ultrasound horn can also be designed in accordance with the concept of the present invention. The concept has been employed on an ultrasound horn which comprises a fixing section, a sealing section and a transfer section extending there between, the sections substantially extending along a straight line, the ultrasound horn being, at its end surfaces at the transition between the sealing section and the transfer section, provided with recesses, and these recesses displaying a curvature such that a line which extends from the sealing section to the fixing section and which follows the end surfaces along the recesses describes a curve.

The above-outlined problem has been solved for this ultrasound horn in that it has been given the characterising features that the recesses have at least a first portion with a first radius of curvature and a second portion with a second radius of curvature, and that of said portions, the first portion is located more proximal the fixing section and the radius of curvature of the first portion is larger than the radius of curvature of the second portion. As was mentioned above, the recess composed of a plurality of radii contributes in evening out and reducing the tension level in the proximity of the recess.

Common to the two last conceptual solutions is that the larger radius is more proximal that part which may be considered as a spring and the smaller radius is most proximal that part which may be considered as a mass.

BRIEF DESCRIPTION OF THE ACCOMPANYING DRAWINGS

The present invention will now be described in greater detail hereinbelow with reference to the accompanying schematic Drawings which, for purposes of exemplification, show a presently preferred embodiment of the present invention. In the accompanying Drawings.

DETAILED DESCRIPTION OF ONE PREFERRED EMBODIMENT

Figure 1:
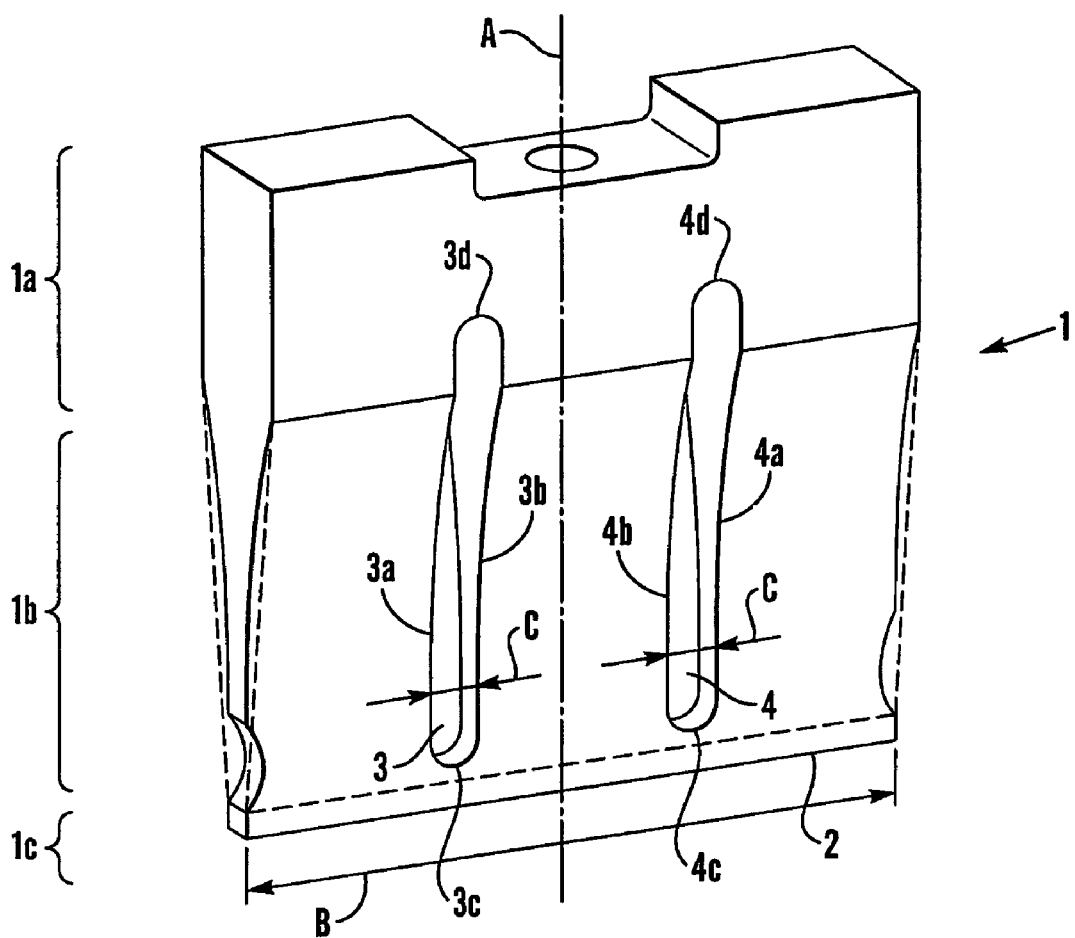
FIG. 1 is a perspective view of a prior art embodiment of an ultrasound horn.
Figure 2:
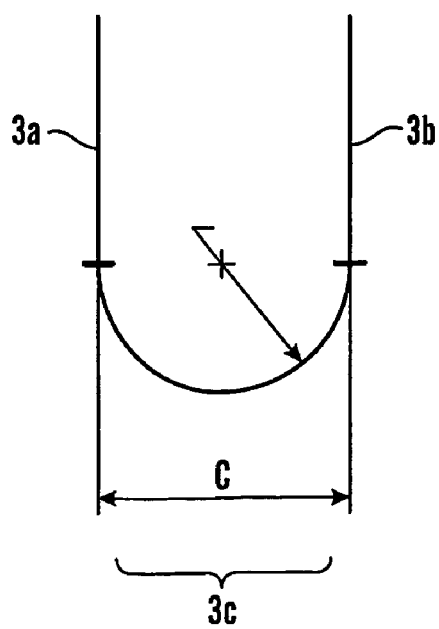
FIG. 2 shows a prior art design of the rounding-off at the lower end of the elongate recess in the ultrasound horn.
Figure 3:
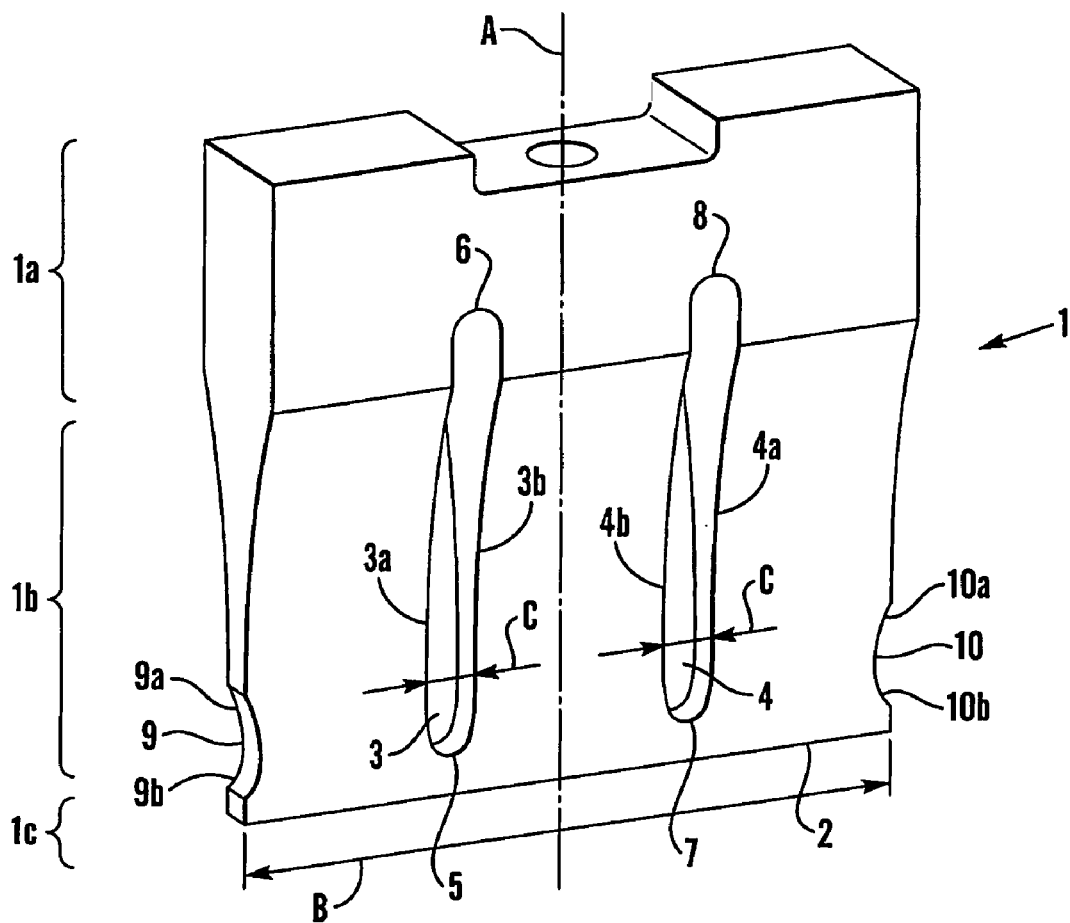
FIG. 3 is a perspective view of one preferred embodiment of an ultrasound horn according to the present invention.

In the figures, the same reference numerals are employed for those parts which are common to the prior art construction and for those different embodiments according to the invention. FIG. 3 shows an ultrasound horn which is intended to be connected to a drive unit and possibly a booster in the conventional manner (not shown).

The ultrasound horn 1 is substantially constructed from a fixing section 1a, a transfer section 1b and a sealing section 1c which extend along a straight line. The ultrasound horn 1 has a sealing surface 2 of a width B which is slightly greater than the width of the joint which is to be created. In order to obtain a uniform amplitude in the axial A oscillations of the sealing surface 2 along the entire width of the sealing surface 2, the ultrasound horn 1 is provided with two axially extending recesses 3, 4.

The recesses 3, 4 are designed so that they are defined by two parallel lines 3a–b, 4a–b which are located at a distance C from one another and two end rounding-offs 5–6, 7–8. The recesses 3, 4 are further through-going so that there is formed three totally separated columns which are interconnected at the fixing section 1a and the sealing section 1c.

Figure 4:
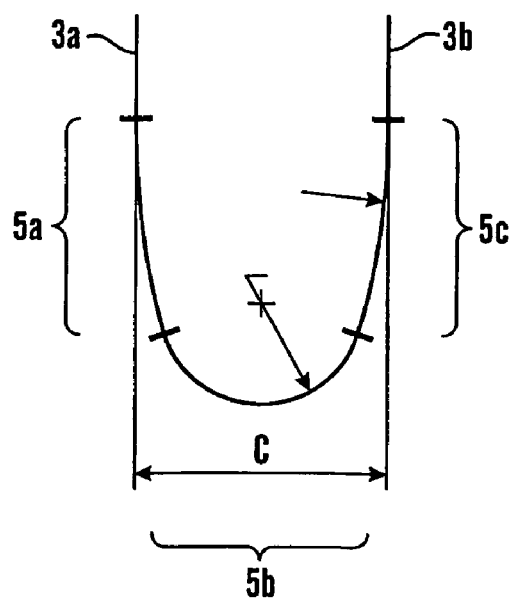
FIG. 4 shows one preferred embodiment of the rounding-off at the lower end of the elongate recess in the ultrasound horn.

The lower rounding-offs 5, 7 are built up from three portions 5a–c, 7a–c of different radii of curvature. The different portions 5a–c, 7a–c of different radii of curvature tangentially connect to each other and to the substantially straight sides 3a–b, 4a–b of the recesses 3, 4. In the illustrated example, the upper, outer portions 5a, c, 7a, c have a radius of 30 mm and the central portion 5b, 7b has a radius of 4 mm. In this case, the recesses 3, 4 have a width C of 10 mm. Thus, the outer, upper radii 5a, c, 7a, c are larger than the nominal radius which could be employed if only one radius with tangential transition is used. Further, the inner, central radii 5b, 7b are smaller than the above mentioned nominal radius. As will be apparent from FIG. 4, the rounding-off is symmetric, i.e. both sides of the rounding-off 5, 7 of the recesses 3, 4 can be mirrored in a symmetric line which extends in the axial direction A and which is located centrally in the recess 3, 4. The outer radii 5a and 5c, 7a and 7c connect to the sides 3a–b, 4a–b at the same height and connect to the central radius 5b, 7b at the same height on either side of the above mentioned symmetry line, i.e. the central radius 5b, 7b extends equally far up towards the recess on either side of the symmetry line.

In the upper ends of the recesses 3, 4, the tensions are not so exaggerated, which implies that it is not as important to design the upper rounding-offs 6, 8 with the same composite configuration. From the point of view of mechanical strength, it is preferred to configurate the upper rounding-offs 6, 8 in the same composite manner, but from the point of view of production engineering, a single radius is to be preferred.

Figure 5:
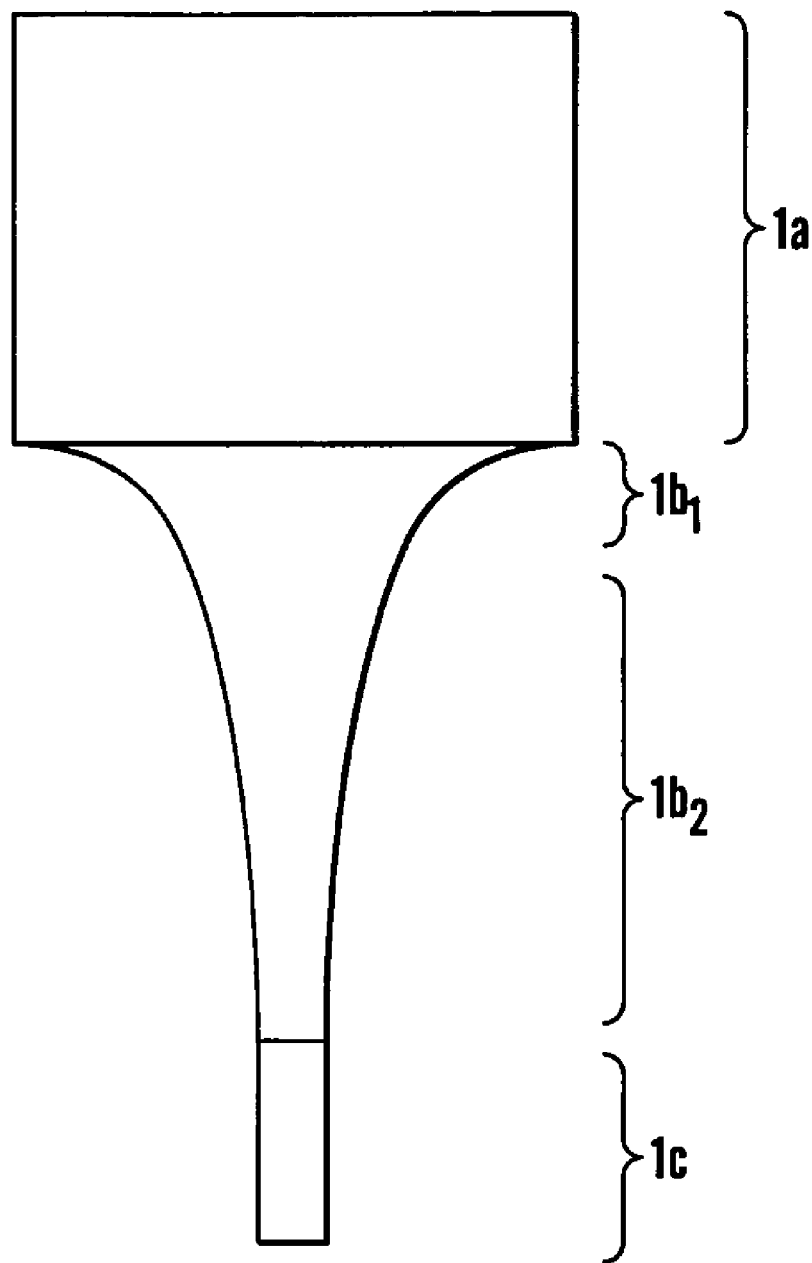
FIG. 5 shows an alternative embodiment of the transfer section seen straight from the side.

As will be apparent from FIG. 5, the transfer section as such may also be formed so that it is composed of different radii. In FIG. 3, it is shown that the transfer section 1b is curved in such a manner that a line which extends from the sealing section to the fixing section and which follows the transfer section describes a curved line. One such direction is the axial direction A which is shown in FIG. 3. If this line were to follow the surface of the transfer section 1b, this line would be curved. As is apparent from FIG. 5, the transfer section 1b includes a first portion 1b$_1$ with a first radius of curvature and a second portion 1b$_2$ with a second radius of curvature. The first portion 1b$_1$ is located more proximal the fixing section and the radius of curvature of this first portion 1b$_1$ is smaller than the radius of curvature of the second portion 1b$_2$.

As is apparent from FIG. 3, other recesses may also be designed so that they are composed of a plurality of radii. In the ends of the sealing section extending along a straight line, the ultrasound horn is provided with recesses 9, 10 in order to even out the oscillation picture so that a correct sealing will be attained throughout the entire width B of the sealing section 1c. These recesses 9, 10 display a curvature such that a line which extends from the sealing section to the fixing section and which follows the end surfaces along the recesses describes a curve. The recesses 9, 10 have at least a first portion 9a, 10a with a first radius of curvature and a second portion 9b, 10b with a second radius of curvature. The first portion 9a, 10a is located more proximal the fixing section 1a and the radius of curvature of this first portion 9a, 10a is greater than the radius of curvature of the second portion 9b, 10b. The recesses 9, 10 extend over the transition between the sealing section 1c and the transfer section 1b.

Common to the composite curvature of the transfer section 1b and the recesses 9, 10 at the end walls is that the larger radius is more proximal that part which may be considered as a spring and the smaller radius is most proximal that part which may be considered as a mass.

It will readily perceived that a number of modifications of the embodiments of the present invention described herein are possible without departing from the scope of the invention as this is defined in the appended claims.

For example, the number of radii with different radii of curvature may be different from that selected in the illustrated embodiments. In the ends of the recesses, it is, for example, conceivable to employ, for example, four or five radii. Naturally, the number of radii may also be varied as regards the curvature of the transfer section and as regards the curvature of the recesses at the ends of the sealing section.

For reasons of design and construction, it is also conceivable that the rounding-off of the recess has an asymmetric configuration with a view to further evening out the tensions.

It should further be observed that corresponding inventive concepts with recesses and other forms built up from a plurality of radii may be employed on other ultrasound horns with other basic configurations than the illustrated basic configuration, in which event these variations are intended to be encompassed within the scope of the present invention as this is defined by the appended claims.

What is claimed is:

1. An ultrasound horn comprising a fixing section, a sealing section and a transfer section extending therebetween, one or more elongate recesses being formed at least in the transfer section, and said recesses extending in a direction between the fixing section and the sealing section, wherein each of said recesses comprises two sides having portions which abut a rounding-off at an end of the recess located most proximal the sealing section, the portions of the two sides facing one another and being parallel to one another, the rounding-off encompassing, along the rounding-off, at least a first portion with a first radius of curvature, a second portion with a second radius of curvature and a third portion with a third radius of curvature, with the first radius of curvature being different from at least one of the second and third radii of curvature.

2. The ultrasound horn as claimed in claim 1, wherein said recess is of a width adjacent the rounding-off, the width being less than the first radius of curvature.

3. The ultrasound horn as claimed in claim 1, wherein said recesses are of a width adjacent the rounding-off, said width being smaller than the third radius of curvature.

4. The ultrasound horn as claimed in claim 1, wherein the second radius of curvature is smaller than the first radius of curvature.

5. The ultrasound horn as claimed in claim 1, wherein the second radius of curvature is smaller than the third radius of curvature.

6. The ultrasound horn as claimed in claim 1, wherein the second radius of curvature is smaller than the width of the recess adjacent the rounding-off.

7. The ultrasound horn as claimed in claim 1, wherein the rounding-off of the recess is symmetrical.

8. The ultrasound horn as claimed in claim 1, wherein the transitions between the different portions of the recess of different radii of curvature are substantially tangential.

9. An ultrasound horn comprising a fixing section, a sealing section and a transfer section extending there between, the transfer section being curved in such a manner that a line which extends from the sealing section to the fixing section and which follows the transfer section describes a curve, wherein the transfer section has at least a first portion with a first radius of curvature and a second portion with a second radius of curvature; and that of said portions, the first portion is located more proximal the fixing section and the radius of curvature of the first portion is smaller than the radius of curvature of the second portion.

10. An ultrasound horn comprising a fixing section, a sealing section and a transfer section extending therebetween, said sections substantially extending along a straight line, the ultrasound horn being, at its end surfaces at the transition between the sealing section and the transfer section, provided with recesses, said recesses displaying a curvature such that a line which extends from the sealing section to the fixing section and which follows the end surfaces along the recesses describes a curve, wherein the recesses have at least a first portion with a first radius of curvature and a second portion with a second radius of curvature; and that wherein, of said portions, the first portion is located more proximal the fixing section and the radius of curvature of the first portion is larger than the radius of curvature of the second portion.

* * * * *